United States Patent [19]

Liermann

[11] Patent Number: 4,543,575
[45] Date of Patent: Sep. 24, 1985

[54] ELECTRIC CIRCUIT FOR REMOTELY CONTROLLING A SELECTED ONE OF A PLURALITY OF MAGNET VALVES

[75] Inventor: Peter Liermann, Barsinghausen, Fed. Rep. of Germany

[73] Assignee: WABCO Fahrzeugbremsen GmbH, Hanover, Fed. Rep. of Germany

[21] Appl. No.: 469,321

[22] Filed: Feb. 24, 1983

[30] Foreign Application Priority Data

Mar. 9, 1982 [DE] Fed. Rep. of Germany ....... 3208394

[51] Int. Cl.4 .............................................. H04Q 3/00
[52] U.S. Cl. ................. 340/825.57; 307/40; 361/191; 340/825.63
[58] Field of Search ...................... 340/825.52, 825.57, 340/825.63; 361/153, 154, 166, 168.1, 169.1, 171, 189, 190, 191; 307/40, 115

[56] References Cited

U.S. PATENT DOCUMENTS

| | | | |
|---|---|---|---|
| 3,836,887 | 9/1974 | Ueda et al. ..................... | 340/825.57 |
| 4,059,844 | 11/1977 | Stewart .......................... | 361/191 X |
| 4,162,486 | 7/1979 | Wyler .............................. | 307/40 X |
| 4,175,238 | 11/1979 | Breimesser et al. .............. | 307/40 |
| 4,215,276 | 7/1980 | Janeway ......................... | 361/191 X |
| 4,315,249 | 2/1982 | Apple et al. .................... | 340/825.52 |

Primary Examiner—Ulysses Weldon
Attorney, Agent, or Firm—J. B. Sotak

[57] ABSTRACT

An arrangement for providing electrical remote control of several magnetic solenoid valves having a transmitter section and a receiver section. The transmitter includes a fixed frequency signal generator for producing signals having an adjustable duty cycle. The duty cycle of the periodic signals varies in accordance with the position or deflection of an adjustable control lever. The periodic signals are transmitted over a first transmission link to the receiver section for controlling the condition of the magnet valves. A second transmission link is utilized for transmitting digital coded address information concerning which of the magnetic valves is to be selected in the receiver section in accordance with the position of the control lever in the transmitter section.

10 Claims, 1 Drawing Figure

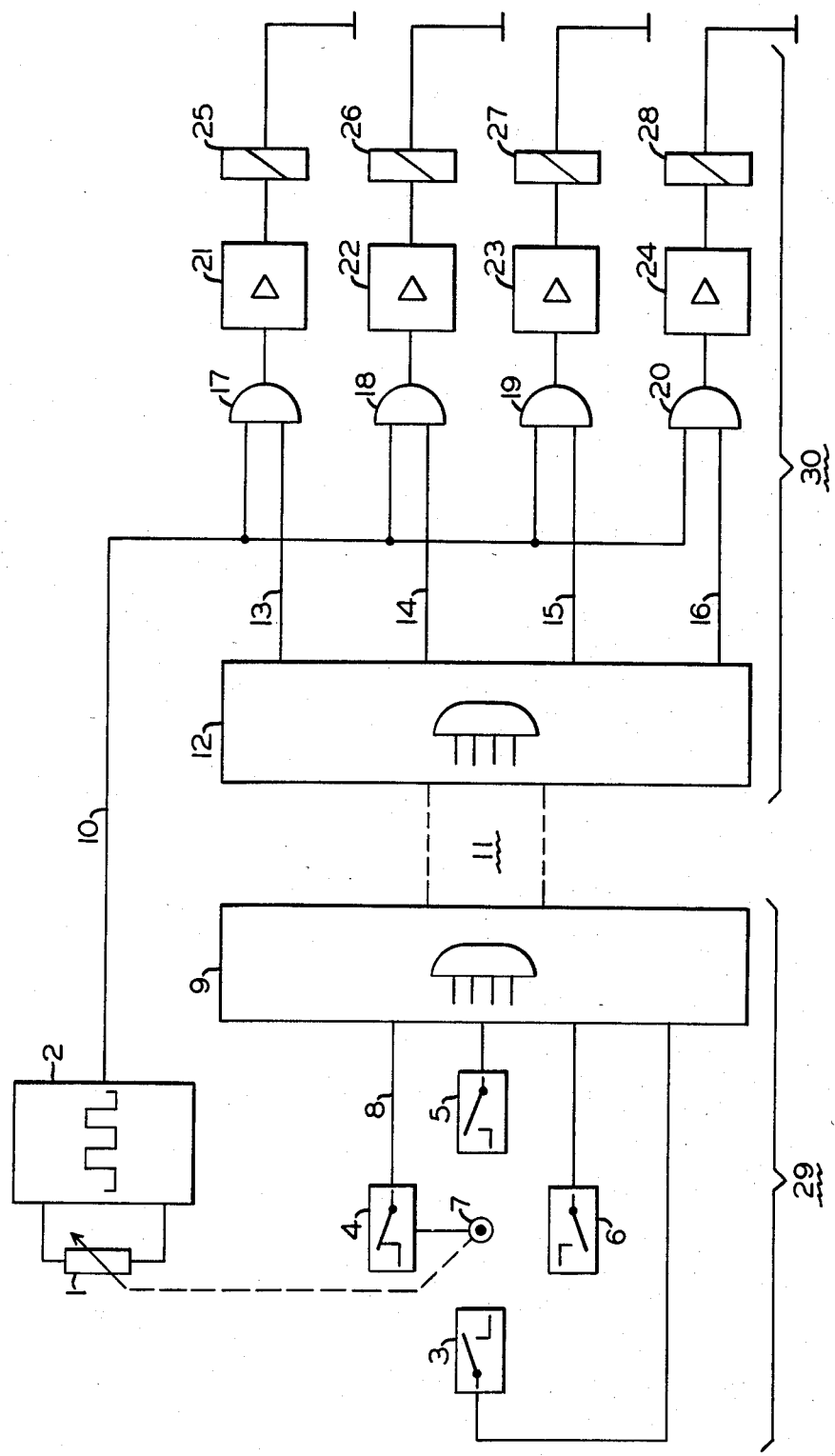

ELECTRIC CIRCUIT FOR REMOTELY CONTROLLING A SELECTED ONE OF A PLURALITY OF MAGNET VALVES

FIELD OF THE INVENTION

This invention relates to an electrical circuit for remotely controlling a given one of a plurality of magnet valves and, more particularly, to a system employing a dual transmission link for conveying a periodic signal and a coded address from a transmitter to a receiver for selectively controlling the electrical condition of a number of solenoid valves.

BACKGROUND OF THE INVENTION

It is common practice to utilize a number of control devices to selectively operate various portions of a pressure system. In a hydraulic power plant having a plurality of operating cylinders, it is conventional to employ magnet valves to control the supply of hydraulic fluid pressure to the individual operating cylinders. In the past, each of the individual magnet valves was hard-wire connected by a separate communication link to a source of d.c. supply voltage. It will be appreciated that such a multichannel system is relatively expensive to construct and maintain.

OBJECTS OF THE INVENTION

Accordingly, it is an object of this invention to provide a system for remotely controlling a plurality of magnet valves with a minimum number of communication links between a transmitter and a receiver.

Another object of this invention is to provide an improved electrical circuit for remotely controlling a selected one of a plurality of solenoid valves.

A further object of this invention is to provide a unique arrangement employing a dual communication link for conveying a periodic signal and a coded address from a transmitter to a receiver for selectively controlling the electrical condition of a number of solenoid valves.

Yet another object of this invention is to provide an electrical circuit for remotely controlling a plurality of magnet valves comprising a transmitter having a signal generator for producing a periodic signal which is conveyed to a first transmission link, the signal generator having a duty cycle which is adjusted by a adjustable control member, the transmitter including a selection switch to remotely control the electrical condition of the plurality of magnet valves, the selection switch including a movable contact which is ganged to the adjustable control member, a coding network is connected between the selection switch and a second transmission link, a receiver including a decoding network connected to the second transmission link, and the coding network produces an output control signal on the second transmission link which is decoded by the decoding network for selectively conditioning a given one of the plurality of the magnet valves to be energized by the periodic signal developed on the first transmission link.

Yet further object of this invention is to provide a new and improved remote control system which is economical in cost and simple in design.

SUMMARY OF THE INVENTION

In accordance with the present invention, there is provided a novel communication system having a transmitter section which is remotely located from a receiver section. The transmitter section includes a multiposition switch which is coupled to a potentiometer. The potentiometer is connected to a signal generator which produces periodic signals having a variable duty cycle. The transmitter includes a coding network which produces a coded output dependent upon the position of the multiposition switch. The periodic signals produced by the signal generator are conveyed over a first transmission link to a plurality of gating circuits in the receiver section while the coded output of the coding network is conveyed over a second transmission link to a decoding network in the receiver section. The decoded output of the decoding network is connected to one of the plurality of gating circuits for passing the periodic signals to an amplifier. The amplified signals are fed to the coil of one of the plurality of electromagnetic valves for energization. The energized electromagnetic valve corresponds to the selected position of the multiposition switch.

BRIEF DESCRIPTION OF THE DRAWING

The above objects and other attendent features and advantages of the present invention will become more fully understood from the following detailed description when considered and reviewed in conjunction with the accompanying drawing, in which:

The single FIGURE is a schematic circuit diagram of an electrical remot control communication arrangement in accordance with the present invention.

DETAILED DESCRIPTION OF THE INVENTION

Referring now to the single FIGURE of the drawing, there is shown a schematic circuit diagram of a transmission system or communication arrangement of the present invention. As shown, the communication system includes a transmitter section 29 and a receiver section 30 which is located at a remote distance. As previously mentioned, it is common practice in hydraulic systems to employ a plurality of solenoid or magnet valves to control the condition of a number of output devices. In the present instance, the electrical state of magnet relays 25, 26, 27 and 28 is controlled in accordance with a selection made at a distant location.

It will be seen that the transmitting portion 29 includes a plurality of switches 3, 4, 5 and 6 which are selectively operated by a movable element or rotary lever 7. It will be understood that the selection lever 7 is arranged to open and close contacts of switches 3, 4, 5 and 6. At any given time, only one of the four switch contacts are closed while three are opened as shown in the drawing, in which switch 4 is closed and switches 3, 5 and 6 are opened.

It will be observed that the movable lever 7 is mechanically linked or ganged to a variable resistor or potentiometer 1 which functions as an adjustable control element for a signal generator 2. As shown, the signal generator 2 produces a square-wave signal having a predetermined frequency and a duty cycle which may be varied or adjusted by changing the position of the movable element 7 which in turn varies the resistive value of the control resistor 1.

It will be seen that the control switches 3, 4, 5 and 6 are connected to the respective input terminals of a coding network 9 which is designed in such a way that its coded output is dependent upon which of the switches is closed by the deflection lever 7. In viewing the single FIGURE, it will be seen that the rotary lever 7 is in a position in which the switch 4 is closed so that an input is applied to line 8 of the coding network 9. If the lever is moved to the other three positions, the switches 3, 5 and 6 supply respective inputs to the leads of the coding network. As shown, the selected coded outputs of the encoder are coupled to transmission lines 11. The transmission link or lines 11 also serve as a convenient means of conveying the coded information concerning the selected magnet valves 25 through 28.

As mentioned above, the control element 1 is selected as a mechanically adjustable potentiometer having a variable member interconnected with the deflection lever 7. The interconnection between the deflection lever 7 and the variable control element 1 is designed in such a way that an increase in the deviation of the deflection lever 7 from a neutral control position into any given one of the four switching positions Will also cause the control element 1 to increase in value.

This results from the fact that the duty cycle of the signals generated by the signal generator 2 is adjustable by the amount of deflection of the deflection lever 7. The output of the signal generator 2 which supplies the signal with a controllable duty cycle is conveyed via a transmission link represented by line 10. Thus, the transmission link 10 serves as a communication medium for signals whereby their duty cycle depends on the deflection of the deflection lever 7 in any given one of selective positions represented by the closure of switches 3, 4, 5 and 6.

Thus, the two transmission links 10 and 11 interconnect the transmitter portion 29 with the receiver portion 30. The transmission link 10 is connected with the primary control input of four gates or gating circuits 17 through 20 which are each associated with the respective magnet valves 25 through 28. Each of the gate circuits 17 through 20 also includes additional control inputs which are connected with the respective outputs of a decoding network 12 via lines 13 through 16.

The inputs of the decoding network 12 are coupled to the encoder via the transmission lines 11. The decoding network 12 is constructed in such a way that at any given time only one of the control lines 13 through 16 is being addressed. Thus, one of the magnet valves is selected by means of the deflection lever 7 based on the information transmitted via transmission lines 11.

The control of the gate circuits 17 through 20, described thus far, affects that at the output of each of the gate circuits controlled via one of the control lines 13 through 16, the signal which has been transmitted via transmission link 10 appears with the duty cycle according to the extent of the deflection of deflection lever 7. The signals appearing at the output of the gate circuits are amplified by amplifiers 21 through 24. The amplified signals are utilized to directly control which one of the magnet valves 25 through 28 is energized. That is, the signals with the variable duty cycle are conveyed via the transmission line 10 to one of the selected magnet valves 25 through 28. Thus, the amplified output of one of the amplifiers 21 through 24 supplies the selected magnet valves. Ergo, an integration of the signals is produced so that in each case a magnetic condition results which is in accordance with the selected position of the deflection lever 7.

It will be readily recognized that the improvement of utilizing the control element 1 along with the adjustment of the deflection lever 7 can also be selected in such a manner that a non-contact, for example, an optical adjustment, may be used with the electronic control element. The propagation of the output signals of the coding network 9 takes place advantageously in a digital coded fashion, for example a BCD-Code. The number of transmission lines in the communication link 11 that are required with a large number of magnet valves which are to be controlled by the present remote control system is dependent upon the type of coding and is considerably smaller than the number of magnets to be controlled by a remote control system.

It will be appreciated that various changes and modifications can be made to the presently described invention and, therefore, it is to be understood that all variations, ramifications and equivalents within the spirit and scope of the present invention are herein meant to be encompassed by the appended claims.

Having now described the invention, what I claim as new and desire to secure by Letters Patent, is:

1. An electrical circuit for remotely controlling each electrical condition of a plurality of magnet valves comprising:
   (a) a transmitter having a signal generator for producing a periodic signal which is conveyed to a first transmission link,
   (b) said signal generator having a duty cycle which is adjusted by an adjustable control member,
   (c) said transmitter including a selection switch to remotely control the electrical condition of said plurality of magnet valves,
   (d) said selection switch including a movable element which is ganged to said adjustable control member,
   (e) said transmitter including a coding network which is connected between said selection switch and a second transmission link,
   (f) a receiver including said plurality of magnet valves and including a decoding network connected to said second transmission link, and
   (g) said coding network produces a coded output control signal on said second transmission link which is decoded by said decoding network for selectively conditioning a given one of said plurality of said magnet valves to be energized by the periodic signals developed on said first transmission link.

2. The electrical circuit as defined in claim 1 wherein said receiver includes a plurality of two-input gates, each of which has one input connected to said first transmission ink and has the other input connected to said decoding network.

3. The electrical circuit as defined in claim 1, wherein said adjustable control member is a potentiometer.

4. The electrical circuit as defined in claim 1, wherein said selection switch includes plurality of fixed contact connected to associated inputs of said coding network.

5. The electrical circuit as defined in claim 1, wherein said coding network conveys digital signals to said decoding network over said second transmission link.

6. The electrical circuit as defined in claim 2, wherein an amplifier is connected between each of said plurality of two-input gates and each of said plurality of magnet valves.

7. The electrical circuit as defined in claim 1, wherein said two-input gates are "AND" gating circuits.

8. The electrical circuit as defined in claim 1, wherein said coding network develops digital coded information on said second transmission link.

9. The electrical circuit as defined in claim 8, wherein said digital coded information developed on said second transmission link is conveyed to said decoding network to select which one of said plurality of said magnet valves is energized by the periodic signals of said first transmission link.

10. The electrical circuit as defined in claim 1, wherein said selection switch is a rotary four-position device.

* * * * *

UNITED STATES PATENT AND TRADEMARK OFFICE
CERTIFICATE OF CORRECTION

PATENT NO. : 4,543,575
DATED : September 24, 1985
INVENTOR(S) : Peter Liermann

It is certified that error appears in the above-identified patent and that said Letters Patent are hereby corrected as shown below:

Column 4, line 50, delete "ink" and insert --link--

Signed and Sealed this

Seventeenth Day of December 1985

[SEAL]

Attest:

DONALD J. QUIGG

Attesting Officer

Commissioner of Patents and Trademarks